Patented June 28, 1932

1,864,839

UNITED STATES PATENT OFFICE

HERBERT LANGWELL, OF EPSOM, AND WILLIAM ARTHUR BURTON, OF ALDWYCH, LONDON, ENGLAND, ASSIGNORS TO COMMERCIAL SOLVENTS CORPORATION, OF TERRE HAUTE, INDIANA, A CORPORATION OF MARYLAND

FERMENTATION OF CELLULOSIC MATERIALS

No Drawing. Application filed November 22, 1926, Serial No. 150,140, and in Great Britain November 26, 1925.

This invention relates to the fermentation of cellulosic materials and has for its main object to provide improvements in the processes of United States Patents Nos. 1,443,881; 1,602,306 and 1,639,571.

The invention consists in a process for the fermentation by thermophilic bacteria of a mash wholly or in part composed of distillery or like wastes and residues under conditions in which the acidity of the mash is controlled so that the hydrogen ion concentration is maintained within the bulk of the mash, for example, by the methods described in Example 8 of United States Patent No. 1,602,306.

According to the above-mentioned patents the fermentation of cellulosic materials has been carried out substantially as follows: cellulosic material in some form, as for example, corncobs, is ground or reduced to a meal or other form. This material is then added in sufficient quantity to water to give an approximately 6% concentration by weight of cellulosic material. To this mash is then added, if needed, suitable amounts of the nutrient materials necessary to give active growth of the bacteria. The mash may then be inoculated by the addition of from 1% to 5% of horse or stable manure which has become heated by auto-fermentation. If desired, instead of using animal manure as the source of the thermophilic bacteria, the mash may be allowed to be fermented spontaneously by the thermophilic bacteria naturally present on the corncob meal. On allowing this material to ferment at temperatures between about 50° and about 70° C. acetic and butyric acids, ethyl alcohol, hydrogen, methane, and carbon dioxide are formed. As the amount of free acid in the mash increases, the activity of the bacteria becomes less and less and hence in order to obtain complete fermentation and generally optimal results it is necessary to maintain the acidity of the mash below certain limits. It has been found that the organisms effecting this fermentation function best when the hydrogen ion concentration of the fermenting mash is maintained between the limits of about pH 9 and pH 5. This optimal hydrogen ion concentration may be maintained by the employment of (a) oxides, hydroxides, carbonates, or bicarbonates of alkali metals including ammonium, or (b) oxides, hydroxides, carbonates or bicarbonates of alkaline earth metals including magnesium, in which cases compounds of alkali metals, which cause the formation of insoluble alkaline earth metal compounds, are added from time to time. It is preferred to follow the procedure outlined under (a); in which case, it is necessary to make small additions of the neutralizing agent at intervals throughout the fermentation. Whatever method is resorted to, the mash should be agitated at frequent intervals or at least after each addition of neutralizing agent.

If the hydrogen ion concentration is regulated by the procedure outlined under (b), it is found that after the fermentation has taken place for some time, the fermentation tends to become slower, owing to the soluble calcium salts which are produced by the neutralization of the acid bodies resulting from the fermentation. Before this point is arrived at, the soluble calcium salts which are the inhibiting bodies must be precipitated, preferably by the addition of suitable quantities of sodium or other alkali metal salts giving rise to the formation of insoluble calcium compounds. It is preferred to make use of sodium sulphate or sodium carbonate for this purpose. From time to time similar additions of alkali metal salts are made in order to keep the hydrogen ion concentration between the required limits and to keep the amount of calcium salts in solution sufficiently low to permit the fermentation to proceed actively. The concentration of calcium salts which brings about inhibition varies with the materials and conditions of working.

In carrying the present invention into effect in one form by way of example, we ferment distillery wastes, obtained from various fermentation processes in a suitable inert vessel, for example a vessel of wood or aluminium and at a temperature between about 50° C. and about 70° C., preferably in the range about 60° C. to 65° C. The operation is carried out substantially as in the cases of the examples previously cited with the exception that we have now found that fermentation distillery wastes may be substituted wholly or in part for the cellulosic material previously used as raw material for the production of acetic and butyric acids and other useful products by the action of thermophilic bacteria. The yields of useful products obtained in this manner naturally depend to a considerable extent upon the source and concentration of the distillery wastes used as the raw materials. If the waste is from a fermentation process employing low concentrations of fermentable materials, obviously the distillery wastes from these processes will contain less material of a utilizable character than those obtained from certain other type of fermentable processes. The character of the different distillery wastes also varies considerably in composition. That from the butyl-acetonic fermentation process may contain say a total of 1.6 grams of soluble and insoluble material when the mash has been made up from corn. This material in the waste distillery slop consists of soluble starch, dextrine, maltose, amino acids, peptides, peptone bodies, etc. These products vary both in character and quantity in the case of other fermentation processes. Regardless of minor variations, however, we have found that when distillery wastes in general are fermented with thermophilic bacteria as above disclosed, satisfactory yields of acetic and butyric acids, ethyl alcohol, hydrogen, methane, and carbon dioxide are obtained. While the fermentation may be carried out on fermentation distillery wastes alone, it is generally preferable to use part distillery wastes and part cellulosic material of the usual character, such a procedure giving higher concentrations of the desired products in the fermented mash and hence facilitating their recovery. In making up a mash consisting of cellulosic material and distillery wastes, the latter may be substituted for part or all of the water ordinarily used in preparing a cellulose-containing mash.

Among the advantages to be obtained by the utilization of distillery wastes and, in some cases, of other wastes is that of economy of heat, because these wastes commonly have heat available for fermentation so that when used as produced the liquors do not initially have to be raised to a suitable fermentation temperature, and in addition in some cases the whole of the raw material for fermentation may be provided by these or other waste products. The utilization in this manner of these waste fermentation products permits a very distinct saving in fermentation processes where cost of the raw material is such an important factor. In the past, attempts have been made to utilize these waste products in the form of cattle food and fertilizers. Such methods of recovery, however, have been expensive and not altogether satisfactory. Our discovery that these waste materials may be satisfactorily used without additional expensive treatment as satisfactory raw material in other fermentation processes is of great importance to the industry.

The invention may be applied to other fermentation processes besides that given by way of example with reference to Example 8 of United States Patent No. 1,602,306, for instance according to processes disclosed in United States Patents Nos. 1,443,881 and 1,639,571 and to other controlled fermentation processes employing thermophilic bacteria.

In this specification and claims the term "distillery wastes" includes fermented or spent washes or residues of fermentation processes, for instance alcoholic yeast fermentation and like wastes, residues or spent liquors, for example waste liquors or residues from fermentation processes for the production of ethyl alcohol, butyl alcohol, acetone, butyric acid, lactic acid and the like, and such residues or liquors may be employed before or after the removal of the useful products. The term "thermophilic bacteria" covers those bacteria whose optimum activity in the fermentation of cellulose occurs at temperatures between about 50° C. and about 70° C.

Processes according to the present invention may be employed for the production of products such as are described in the specification of United States Patent No. 1,602,306.

It is to be understood that the present invention relates only to the use of fermentation waste liquors in excess of the nutrient requirements of the bacteria. The use of such liquors in small quantities to supply nutrients for the bacteria is claimed in co-pending application, U. S. Ser. No. 150,139 filed November 22, 1926 by Herbert Langwell and Eloi Ricard and forms no part of the present invention.

Now having described our invention what we claim as new and desire to secure by Letters Patent is:

1. The process which comprises the fermentation by thermophilic bacteria of a mash containing fermentation distillery wastes substantially in excess of the nutrient requirements of the bacteria.

2. The process which comprises the fermentation by thermophilic bacteria of a cellulosic mash containing fermentation distillery wastes substantially in excess of the nutrient requirements of the bacteria.

3. The process which comprises the fermentation by thermophilic bacteria of a mash containing waste distillery slop produced in the butyl-acetonic fermentation process, the amount of said slop being substantially in excess of the nutrient requirements of the bacteria.

4. The process which comprises the fermentation by thermophilic bacteria of a cellulosic mash containing waste distillery slop produced in the butyl-acetonic fermentation process, the amount of said slop being substantially in excess of the nutrient requirements of the bacteria.

5. In a process for the production of aliphatic acids and other useful products by fermentation, the steps which comprise inoculating with thermophilic bacteria a mash containing fermentation distillery wastes substantially in excess of the nutrient requirements of the bacteria and allowing fermentation to take place at temperatures from 50° C. to 70° C.

6. In a process for the production of aliphatic acids and other useful products by fermentation, the steps which comprise inoculating with thermophilic bacteria a cellulosic mash containing fermentation distillery wastes substantially in excess of the nutrient requirements of the bacteria and allowing fermentation to take place at temperatures from 50° C. to 70° C.

7. In a process for the production of aliphatic acids and other useful products by fermentation, the steps which comprise inoculating with thermophilic bacteria a mash containing waste distillery slop produced in the butyl-acetonic fermentation process, the amount of said slop being substantially in excess of the nutrient requirements of the bacteria, and allowing fermentation to take place at temperatures from 50° C. to 70° C.

8. In a process for the production of aliphatic acids and other useful products by fermentation, the steps which comprise inoculating with thermophilic bacteria a cellulosic mash containing waste distillery slop produced in the butyl-acetonic fermentation process, the amount of said slop being substantially in excess of the nutrient requirements of the bacteria, and allowing fermentation to take place at temperatures from 50° C. to 70° C.

9. In a process for the production of aliphatic acids and other useful products by fermentation, the steps which comprise inoculating with thermophilic bacteria a mash containing fermentation distillery wastes substantially in excess of the nutrient requirements of the bacteria and allowing fermentation to take place at temperatures from 50° C. to 70° C. while controlling the acidity of the mash so that the hydrogen ion concentration is maintained within the limits pH 9 and pH 5 by the employment of materials selected from the group consisting of oxides, hydroxides, carbonates and bicarbonates of the alkali metals including ammonium.

10. In a process for the production of aliphatic acids and other useful products by fermentation, the steps which comprise inoculating with thermophilic bacteria a cellulosic mash containing fermentation distillery wastes substantially in excess of the nutrient requirements of the bacteria and allowing fermentation to take place at temperatures from 50° C. to 70° C. while controlling the acidity of the mash so that the hydrogen ion concentration is maintained within the limits pH 9 and pH 5 by the employment of materials selected from the group consisting of oxides, hydroxides, carbonates and bicarbonates of the alkali metals including ammonium.

11. In a process for the production of aliphatic acids and other useful products by fermentation, the steps which comprise inoculating with thermophilic bacteria a mash containing waste distillery slop produced in the butyl-acetonic fermentation process, the amount of said slop being substantially in excess of the nutrient requirements of the bacteria, and allowing fermentation to take place at temperatures from 50° C. to 70° C. while controlling the acidity of the mash so that the hydrogen ion concentration is maintained within the limits pH 9 and pH 5 by the employment of materials selected from the group consisting of oxides, hydroxides, carbonates and bicarbonates of the alkali metals including ammonium.

12. In a process for the production of aliphatic acids and other useful products by fermentation, the steps which comprise inoculating with thermophilic bacteria a cellulosic mash containing waste distillery slop produced in the butyl-acetonic fermentation process, the amount of said slop being substantially in excess of the nutrient requirements of the bacteria, and allowing fermentation to take place at temperatures from 50° C to 70° C. while controlling the acidity of the mash so that hydrogen ion concentration is maintained within the limits pH 9 and pH 5 by the employment of materials selected from the group consisting of oxides, hydroxides, carbonates and bicarbonates of the alkali metals including ammonium.

In testimony whereof we have signed our names to this specification.

HERBERT LANGWELL.
WILLIAM ARTHUR BURTON.